United States Patent
Hogenhout

(10) Patent No.: US 6,832,197 B2
(45) Date of Patent: Dec. 14, 2004

(54) MACHINE INTERFACE

(75) Inventor: Wide Roeland Hogenhout, Wemmel (BE)

(73) Assignee: Canon Kabushiki Kaisha, Tokyo (JP)

(*) Notice: Subject to any disclaimer, the term of this patent is extended or adjusted under 35 U.S.C. 154(b) by 313 days.

(21) Appl. No.: 09/803,970

(22) Filed: Mar. 13, 2001

(65) Prior Publication Data
US 2002/0004719 A1 Jan. 10, 2002

(30) Foreign Application Priority Data

Mar. 23, 2000 (GB) .............................. 0007125

(51) Int. Cl.⁷ .............................. G10L 15/00
(52) U.S. Cl. .................... 704/275; 704/272
(58) Field of Search .................... 704/272, 275, 704/240, 207, 257, 260; 379/88.01

(56) References Cited

U.S. PATENT DOCUMENTS

| | | | |
|---|---|---|---|
| 5,557,722 A | | 9/1996 | DeRose et al. ............. 395/148 |
| 5,884,266 A | | 3/1999 | Dvorak ..................... 704/275 |
| 5,937,422 A | * | 8/1999 | Nelson et al. ............ 715/531 |
| 6,044,347 A | * | 3/2000 | Abella et al. ............ 704/272 |
| 6,246,981 B1 | * | 6/2001 | Papineni et al. ........... 704/235 |

FOREIGN PATENT DOCUMENTS

| EP | 0645757A1 1 | 3/1995 |
|---|---|---|
| WO | WO 00/05708 | 2/2000 |

* cited by examiner

Primary Examiner—Daniel Abebe
(74) Attorney, Agent, or Firm—Fitzpatrick, Cella, Harper & Scinto

(57) ABSTRACT

A machine interface for interfacing a user to a machine receives input words from a user. Scores for at least some of the input words are determined using scores for words appearing in each passages of the text. A passage in the text having the highest combined score for the input words is identified and a corresponding dialogue instruction set is executed to generate words for output and to respond to input words from the user.

20 Claims, 6 Drawing Sheets

MACHINE INTERFACE

The present invention generally relates to a machine interface allowing a user to interface to a machine by entering into a dialogue with the machine.

A method of interfacing the user with a machine which uses speech recognition has been developed in the prior art and is termed a spoken dialogue system (SDS). A spoken dialogue system is a system which interacts with a user by using speech recognition to recognise what a user says and perhaps performs further analysis of the utterance to understand what it means. The system can communicate information back to a user to, for example, indicate what state it is in or to give information the user has asked for. This may be done, for example, using a display, speech synthesis, or by playing back recorded speech.

The creation of an SDS is often very expensive because it is bespoke and made by specialists. It is preferable to have a reusable SDS which can be used for many applications. Such a system can be termed a generic SDS. Such a prior art SDS is a voice browser which executes a mark-up language such as VoXML or VoiceXML. However, because it is very general, it has limited functionality.

In order to implement a generic SDS, an instruction set is required in order to determine its behaviour. VoXML and VoiceXML are examples of such specifications which tell a voice browser what to do. A more specialised generic SDS can have more functionality but will still require some form of specification that it can execute.

In the prior art there are an increasing number of documents which are marked-up with some special language that the reader of the document normally does not see directly. Examples of these types of documents are html (which is used for things such as layout by browsers), and a mark-up language called TranScribe III which is used for Canon manuals. In the case of TranScribe III, the mark-up language is used for typesetting by printers and for supporting translators in their work when translating manuals. Other types of mark-up languages are SGML and XML. All mark-up languages have the following characteristics in common:

1. They contain information about the structure or presentation of the document which can be, for example, used for determining the layout of the document or for searching for information in the document.
2. They are normally not directly visible to the reader of the document but have an effect on aspects such as layout or search functions.

In generic spoken dialogue systems there are special and different types of mark-up languages such as VoXML and VoiceXML. These allow a developer who wants to make a dialogue system to use a "reusable" generic dialogue system and hence just write a dialogue specification without doing any programming, or doing only a small part of the development work. They do not, however, serve to mark-up a text which is intended to be readable for humans.

Automatic conversion of text documents, e.g. in a mark-up language, to an SDS specification to provide a spoken dialogue system interface between the information content of the document and the user is known in the prior art.

The present invention provides a machine interface in which passages comprising discrete information segments in a document are identified and converted into separate dialogue instruction sets. Scores, or more specifically probabilities, for words appearing in each passage of the text are determined and stored. The scores can then be used to determine a combined score for words input by a user in order to try to identify a passage which relates to a user's input. For a passage which is identified as having the highest combined score, the corresponding dialogue instruction set can be executed by the dialogue system.

Thus in this way large documents which are not suitable for straightforward conversion into a dialogue specification can be converted in a segmented manner allowing the user to enter into a dialogue with the system in order to identify the appropriate dialogue specification segment which should be executed.

In the prior art when a document consists of many parts which can easily be scanned through visually but which would take far too long to read out one by one, an automatically generated dialogue system would provide an inferior interface between the information content of the document and the user. Although the original document may have an index to assist the reader in finding what they want, this is not applicable after a conversion to a dialogue specification. The index for the manual, for example, refers the user to a page number which in the dialogue system has no meaning. The dialogue system is likely to ignore page breaks of the manual, making the page numbers useless within the dialogue specification.

The present invention is particularly suited to a spoken dialogue system. However, the present invention is not limited to the use of speech as a means of interfacing a machine and the user. Any means by which the user can enter words into and receive words from a machine is encompassed within the scope of the present invention. For example, the user input may be speech but the output may be a display or vice versa. Alternatively, simple keyboard input and a display response can be used.

The present invention is applicable to any form of document, not just a marked-up document. The passages of text can be identified using any distinctive characteristics of the document such as page breaks, headings, fonts, paragraphs or indents. With the proliferation of the use of marked-up text, the present invention is particularly suited to such texts since the mark-up is likely to facilitate greatly the identification of specific pieces of information.

The passages in the text document can represent a procedure in, for example, a machine manual, or they can comprise logically distinct segments of information.

In one embodiment of the present invention, instead of simply executing the dialogue instruction set which has the highest combined score, in order to confirm that the identified dialogue instruction set represents the information the user is seeking, the interface can generate a user prompt which corresponds to the passage and hence the dialogue instruction set. If a user responds positively to the prompt, the dialogue instruction set is executed. If the user, however, responds negatively to the prompt, the score for the passage and hence the dialogue instruction set is reduced and a prompt for the dialogue instruction set having the next highest combined score is output to the user. This process is repeated until a dialogue instruction set is executed, or a user enters a different instruction or request in which case the dialogue system restarts the search for a likely dialogue instruction set which has the highest score.

In order to simplify the search procedure for an appropriate dialogue instruction set, in one embodiment, non-information bearing words input by a user such as "the", "a", "how", "do", and "I" are ignored when determining the combined scores. Thus only those words are selected which are distinctive and which will help in the identification of a dialogue instruction set.

The present invention is applicable both to a machine interface in which the dialogue instruction sets and word scores have been predetermined, and to a separate configuration machine for generating the dialogue instruction sets and word scores. In accordance with the present invention, the dialogue instruction sets and the word scores corresponding to the dialogue instruction sets can be generated separately to the interface and provided thereto.

The interface of the present invention can be implemented on any programmable machine controlled by a processor by providing a suitable processor implementable instruction code to the machine. The present invention thus encompasses a processor implementable instruction code for controlling a processor to implement the method and a carrier medium for carrying the processor implementable instruction code, e.g. a storage medium such as a floppy disc, CD ROM, random access memory, read-only memory, or magnetic tape device, and a carrier signal such as an electrical signal carrying the code over a network such as the Internet.

Embodiments of the present invention will now be described with reference to the accompanying drawings, in which:

FIG. 1 is a schematic diagram of a spoken dialogue system of an embodiment of the present invention in which spoken dialogue configuration data is generated from text. Generation of such data must occur before implementation of the spoken dialogue system, and generation of the data can take place independently of implementation of the spoken dialogue system.

Figure 1:
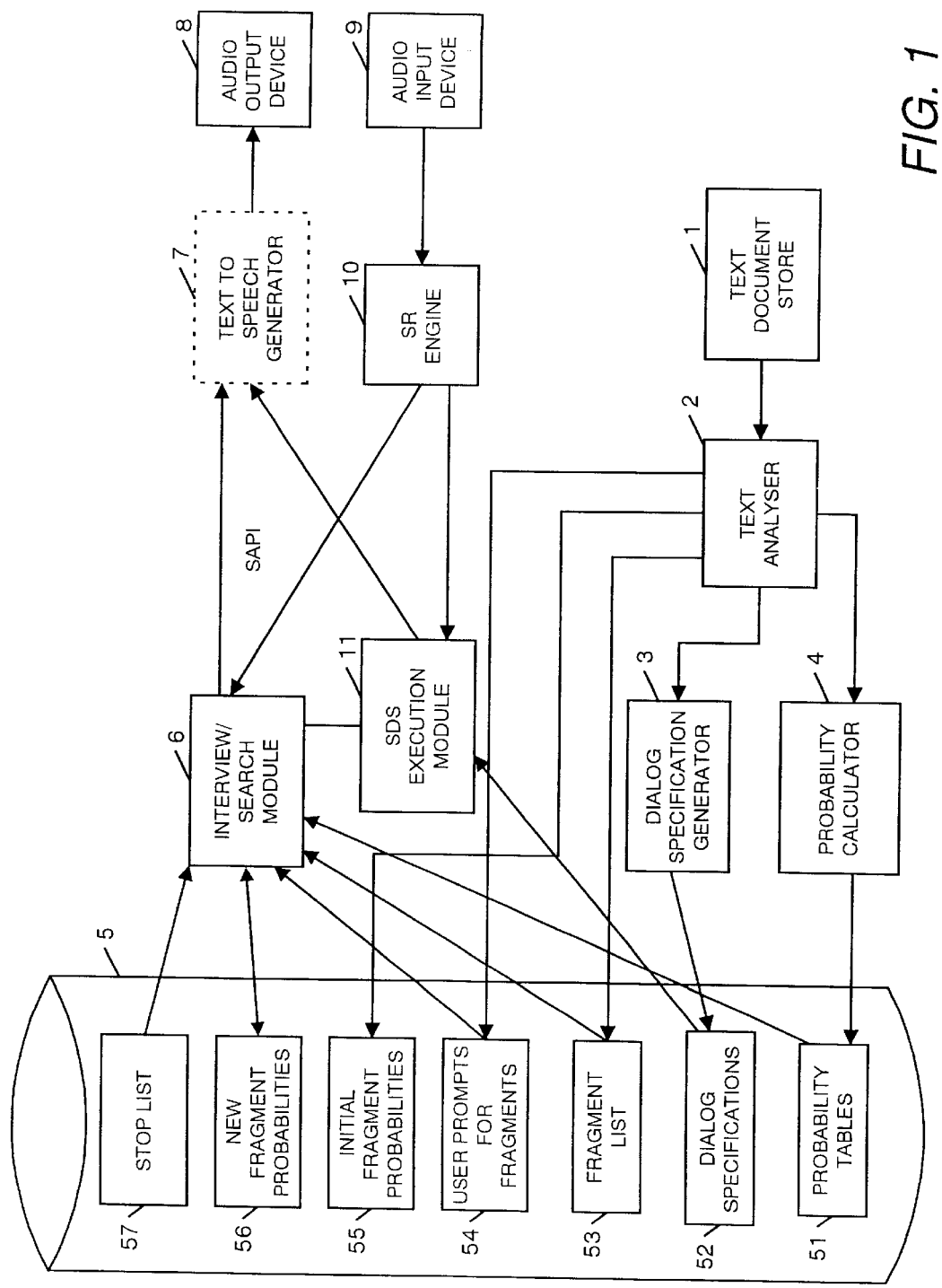
FIG. 1 is a schematic diagram of a spoken dialogue system forming a machine interface in accordance with an embodiment of the present invention.

The generation of the spoken dialogue system configuration data is carried out by providing a text document store 1 in which a text document to be used for the generation of the spoken dialogue system is stored. A text analyser 2 analyses the text in the document store 1 in order to identify passages or fragments which will be converted to separate spoken dialogue specifications by the spoken dialogue specification generator 3. The spoken dialogue specification generator 3 generates the spoken dialogue specifications 52 which are stored in a storage device or database 5. The text analyser 2 further generates a fragment list 53 listing the fragments of text, user prompts 54 for each fragment, and initial fragment probabilities 55 which are stored in the database 5. A probability calculator 4 analyses the word content of each fragment of the text determined by the text analyser 2 in order to generate probability tables 51 which are stored in the database 5.

Thus the spoken dialogue system configuration data generated by the text analyser 1, the dialogue specification generator 3 and the probability calculator 4 comprise the probability tables 51, the dialogue specifications 52 the fragment list 53, the user prompts 54 and the initial fragment probabilities 55.

Within the database 5 there is also stored a stop list 57 which contains a list of non-information bearing words which are to be ignored during the search procedure for the spoken dialogue specification to be executed. Also stored within the database 5 are new fragment probabilities 56 which are continuously updated during the search procedure.

To interface with the user, the spoken dialogue system comprises an audio input device 9 for receiving speech from a user. A speech recognition engine 10 receives the input audio signal and outputs this to a spoken dialogue system execution module 11 and an interview/search module 6. The interview/search module 6 performs the search procedure in order to identify a desired fragment of text and thus corresponding spoken dialogue instruction set which is to be executed by the spoken dialogue system execution module 11. To output information to a user there is provided an audio output device 8. Optionally a text to speech generator 7 can be provided if the output of the interview/search module 6 and the output of the spoken dialogue system execution module 11 comprises text. When the output of the interview/search module 6 and the spoken dialogue system execution module 11 comprises an audio signal, the text to speech generator 7 is not required.

Figure 2:
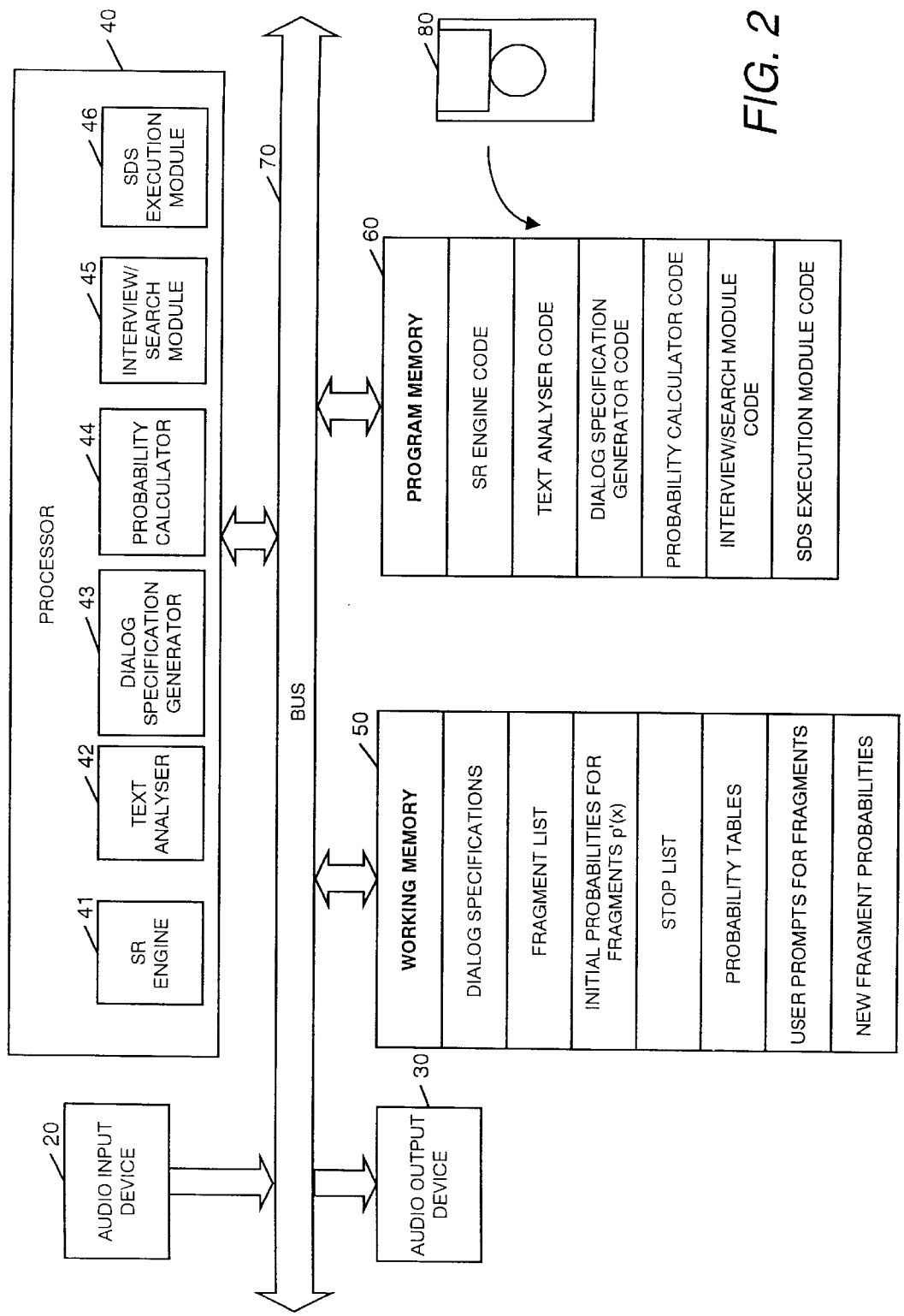
FIG. 2 is a schematic diagram of the implementation of the spoken dialogue system of the embodiment of FIG. 1 in a general purpose computer.

The spoken dialogue system schematically illustrated in FIG. 1 can be implemented on any form of processing apparatus. FIG. 2 illustrates the implementation of the system in a general purpose computer.

Audio input from a user is input to the system by an audio input device 20. The audio output to the user is generated by an audio output device 30. A processor 40 is provided for implementing instruction code modules stored in a program memory 60. When the processor 40 implements an instruction code module read from the program memory 60, a working memory 50 is used for the storage of data. Each of the elements of the computer system are linked by a data and control bus 70.

The processor 40 implements a speech recognition engine 41 by loading and implementing the search recognition engine code from the program memory 60. The processor 40 also implements the text analyser 42 by loading and implementing the text analyser code from the program memory 60. Also the processor 40 implements the dialogue specification generator 43 by loading and implementing the dialogue specification generator code from the program memory 60. Further, the processor 40 implements the probability calculator 44 by loading and running the probability calculator code from the program memory 60. Also, the processor 40 implements the interview/search module 45 by loading and running the interview/search module code from the program memory 60. Further, the processor 40 implements the spoken dialogue system execution module 46 by loading and running the spoken dialogue system execution module code from the program memory 60.

The working memory 50 stores the spoken dialogue system configuration data and other data stored in the database 5 of FIG. 1 i.e. the dialogue specifications, the fragment list, the initial probabilities for the fragments, the stop list, the probability tables, the user prompts for fragments, and the new fragment probabilities.

The program code stored in the program memory 60 can be provided to the program memory 60 from any suitable carrier medium such as a floppy disk 80.

The method of operation of the embodiment and present invention will now be described with reference to FIGS. 3 to 6.

Figure 3:
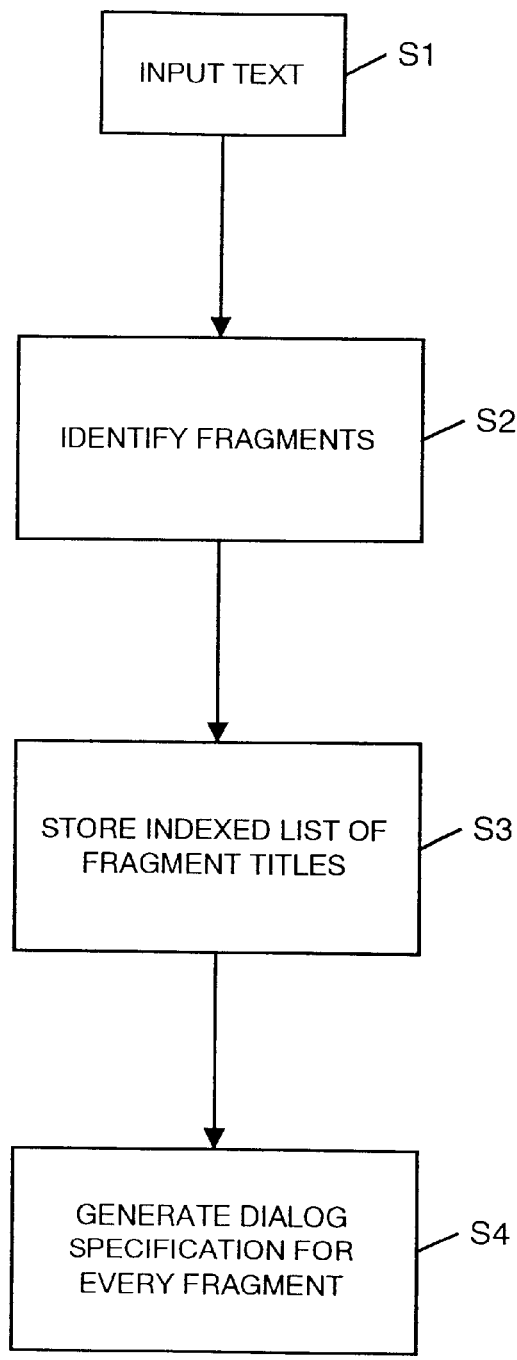
FIG. 3 is a flow diagram of the steps of the method of generating the dialogue specification for each text fragment.

Referring to FIG. 3, in step S1 text is input for the formation of a spoken dialogue system specification. An example of the text in the mark-up language Transcribe III is given below:

```
<heading.3> Printing Documents stored in the Mail
Box</heading. 3>
<body.3>
<p> You can print out documents stored in the Mail
Box.</p>
<proc.op>
<proc.op. step><proc.op.step.num>1</proc.op.step.num><pr
oc.op.substep>
<proc.op.substep.images><image.plain name="p_8_6_3"
break="break"pos="c" okay="notokay">
</proc.op.substep.images></proc.op.substep><proc.op.sub
step><proc.op.substep.title>
Press the <symbol name="mailbox">key.
</proc.op.substep.title></proc.op.substep></proc.op.step>
<proc.op.step>
<proc.op.step.num>2</proc.op.step.num>
<proc.op.substep><proc.op.substep.images><image.plain
name="p_8_6_4" break="break"
pos="c"
okay="notokay"></proc.op.substep.images></proc.op.subst
ep>
<proc.op.substep><proc.op.substep.title>Press the desired
Mail Box number.
</proc.op.substep.title><proc.op.substep .desc>
<memo><title>MEMO</title><list.unordered>
<list.item.tag></list.item.tag>
<list.item>You can directly enter the Mail Box number
using the Number keys
(<symbol name="zero"> - <symbol name="nine">).
</list.item></list.unordered></memo>
</proc.op.substep.desc>
</proc.op.substep></proc.op.step>
<proc.op.step>
<proc.op.step.num>3</proc.op.step.num>
<proc.op.substep><proc.op.substep.images><image.plain
name="p_8_6_5" break="break"
pos="c"
okay="notokay"></proc.op.substep.images></proc.op.subst
ep>
<proc.op.substep><proc.op.substep.title>Enter the
password, and press the
[OK]<?PI c c
&U00A0; >key.</proc.op.substep.title><proc.op.substep.de
sc><memo><title>
MEMO</title><list.unordered>
<list.item.tag></list.item.tag>
<list.item>Enter the password used when the Mail Box was
stored.
(See "Mail Box Setting/Storing," on p.<?PI c c
&U00A0;>4-34.)<break>If
a password has not been stored, this operation is not
required.<list, item>
<list.unordered></memo></proc.op.substep.desc></proc.o
p.substep></proc.op.step>
<?Pub _newpage>
<proc.op.step>
<proc.op.step.num>4</proc.op.step.num>
<proc.op.substep><proc.op.substep.images><image.plain
name="p_8_7_3" break="break"
pos="c"
okay="notokay"></proc.op.substep.images></proc.op.subst
ep>
<proc.op.substep><proc.op.substep.title>Select the
document you wish to print,
and press the
[PRINT]<?PI c c
&(U00A0;>key.</proc.op.substep.title></proc.op.substep><
/proc.op.step>
<proc.op.step>
<proc.op.step.num>5</proc.op.step.num>
<proc.op.substep><proc.op.substep.images><image.plain
name="p_8_7_4" break="break"
pos="c"
okay="notokay"></proc.op.substep.images></proc.op.subst
ep>
<proc.op.substep><proc.op.substep.title>Enter the number
```

-continued

```
of sets you want
to print, and press the [OK]<?PI c c
&U00A0; >key.</proc.op.substep.title>
<proc.op.substep.desc>
<memo><title>MEMO </title><list.unordered>
<list.item.tag></list.item.tag>
<list.item>Enter the quantity with the number keys
(<symbol name="zero"> -
<symbol name="nine">).</list.item>
<list.item.tag></list.item.tag>
<list.item>*If you make a mistake entering the quantity,
press the
<symbol name="clear"><?PI c c &U00A0;>key and re-enter
the correct quantity.
</list.item></list.unordered></memo></proc.op.substep.d
esc></proc.op.substep>
</proc.op.step></proc.op>
```

In step S2 fragments or passages within the text are identified. For example, in the above example, the text represents a single fragment which relates to the procedure for printing documents stored in a mailbox. In step S2 several of such documents can be identified simply by looking for the mark up tag "<Heading.3>".

Figure 4:
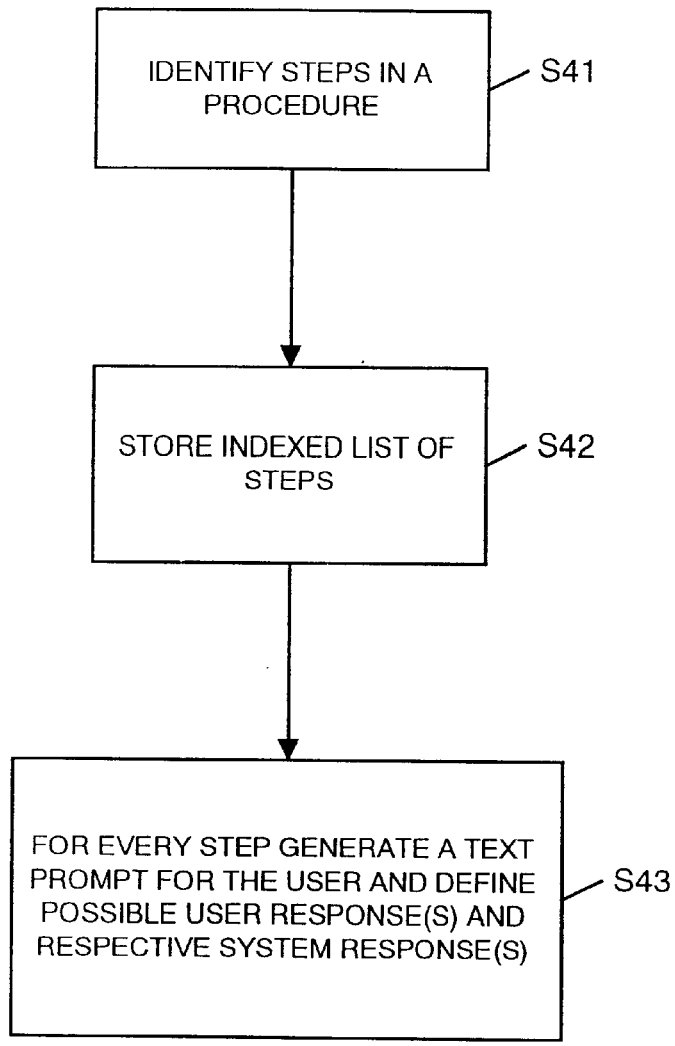
FIG. 4 is a flow diagram illustrating the steps of the generation of the dialogue specification of step S4 in FIG. 3 in more detail.

In step S3 an indexed list of the fragment titles is stored and in step S4 a dialogue specification is generated for each fragment. FIG. 4 illustrates the steps of generating the dialogue specification in more detail. In step S41 each step in a fragment, which in this case defines a procedure, is identified. As can be seen this example each step can be identified by the marked up text "<proc.op.step.num>3</proc.op.step.num>"The identified steps are then stored in an indexed list in step S42.

For every step in the procedure a text prompt is generated for the user and a possible user response or responses are defined together with a respective system response or responses in step S43. This results in the SDS specification given below:

```
<?xml version="1.0;"?>
<DIALOG>
<STEP NAME="init">
<PROMPT> <AUDIO
SRC="..\\Demo\\Data\\soundfiles\\Instruct130_1.wav"/>
</PROMPT>
<INPUT TYPE="OPTIONLIST">
<OPTION NEXT="#step2"> okay </OPTION>
<OPTION NEXT="#jumpout"> stop </OPTION>
</INPUT>
</STEP>
<STEP NAME="step2">
<HELP> <AUDIO
SRC="..\\Demo\\Data\\soundfiles\\Instruct130_memo2.wav"/>
</HELP>
<PROMPT> <AUDIO
SRC="..\\Demo\\Data\\soundfiles\\Instruct130_2.wav"/>
</PROMPT>
<INPUT TYPE="OPTIONLIST">
<OPTION NEXT="#step3"> okay </OPTION>
<OPTION NEXT="#jumpout"> stop </OPTION>
</INPUT>
</STEP>
<STEP NAME="step3">
<HELP> <AUDIO
SRC="..\\Demo\\Data\\soundfiles\\Instruct130_memo3.wav"/>
</HELP>
<PROMPT> <AUDIO
SRC="..\\Demo\\Data\\soundfiles\\Instruct130_3.wav"/>
</PROMPT>
<INPUT TYPE="OPTIONLIST">
```

-continued

```
<OPTION NEXT="#step4"> okay </OPTION>
<OPTION NEXT="#jumpout"> stop </OPTION>
</INPUT>
</STEP>
<STEP NAME="step4">
<PROMPT> <AUDIO
SRC="..\\Demo\\Data\\soundfiles\\Instruct130_4.wav"/>
</PROMPT>
<INPUT TYPE="OPTIONLIST">
<OPTION NEXT="#step5"> okay </OPTION>
<OPTION NEXT="#jumpout"> stop </OPTION>
</INPUT>
</STEP>
<STEP NAME="step5">
<HELP> <AUDIO
SRC="..\\Demo\\Data\\soundfiles\\Instruct130_memo5.wav"/>
</HELP>
<PROMPT> <AUDIO
SRC="..\\Demo\\Data\\soundfiles\\Instruct130_5.wav"/>
</PROMPT>
<INPUT TYPE="OPTIONLIST">
<OPTION NEXT="#endofexplanation"> okay </OPTION>
<OPTION NEXT="#jumpout"> stop </OPTION>
</INPUT>
</STEP>
<STEP NAME="endofexplanation">
<PROMPT> <AUDIO
SRC="..\\Demo\\Data\\soundfiles\\finished_instr.wav"/>
</PROMPT>
</STEP>
<STEP NAME="jumpout">
<PROMPT> <AUDIO
SRC="..\\Demo\\Data\\soundfiles\\stopped_instr.wav"/>
</PROMPT>
</STEP>
</DIALOG>
```

As can be seen in the above example, each step has an audio prompt e.g. "Instuct130_2.wav" stored as a recorded audio message file. This is the output prompt to a user. If a user responds "OK", the next option is to proceed to step 3. If the user responds "stop" the spoken dialogue specification "jumps out" and halts. A user can also request help which will result in the output of the audio in an audio file e.g. "Instruct130_Memo2.wav".

Figure 5:
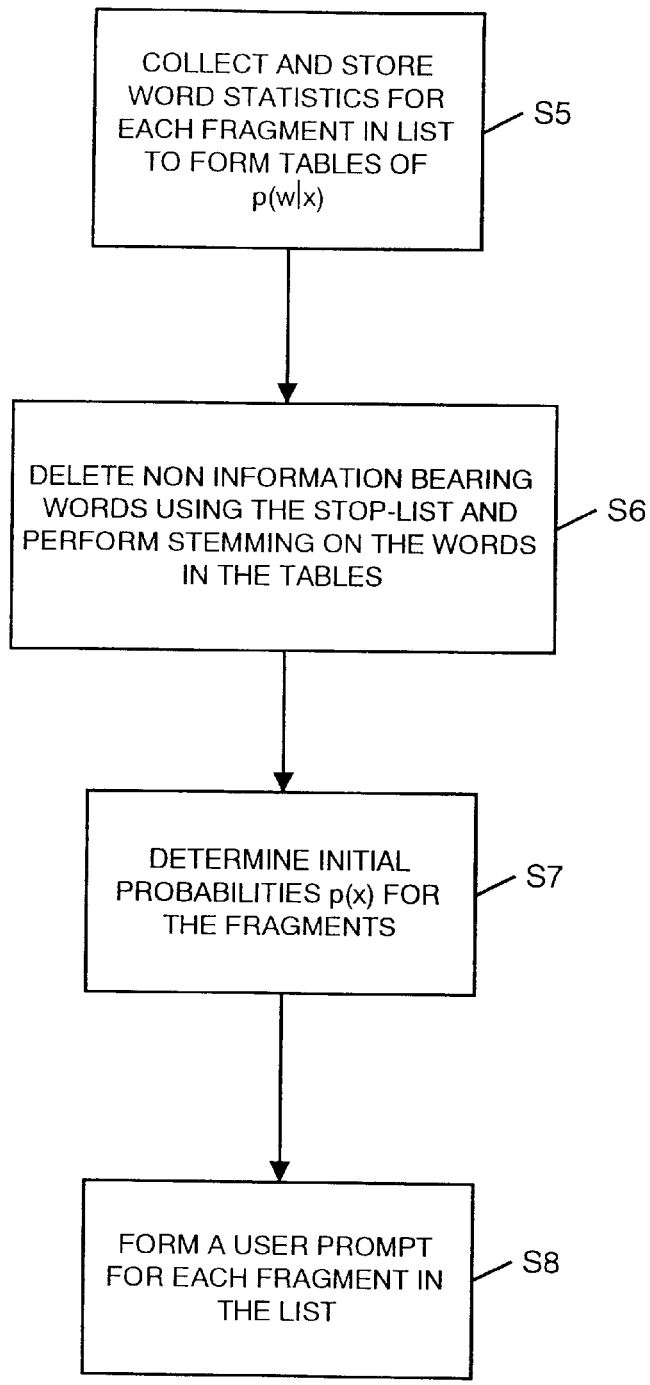
FIG. 5 is a flow diagram of the steps carried out in generating the probabilities and the user prompts for each fragment.

It must be seen that the result of the operation of the dialogue specification generator 3 is a list of spoken dialogue specifications. This is however of no use if a user cannot select an appropriate one. Means by which a user can select an appropriate one by dialogue is provided by the use of word probabilities. FIG. 5 illustrates the process for generating such word probabilities.

In step S5 word statistics for each fragment in the fragment list is collected and stored to form a table of probabilities of words given the fragment (p(w|x).

In step S6 non-information bearing words are deleted using the stop-list and words in the tables are stemmed to remove suffixes. Thus, probability for unimportant words such as "the" are not stored in the table.

In step S7 initial probabilities p(x) for the fragments are determined. For example, it can be determined that the user is more likely to request one particular fragment rather than others and thus appropriate probabilities can be determined for the fragments. This therefore gives the fragments a ranking in order of likelihood of being requested by a user.

In step S8 a user prompt for each fragment is formed. The user prompt can be generated taking into consideration the information in the heading. For example, the user prompt for the fragment given hereinabove could comprise "Do you wish to print documents stored in the mailbox?".

Thus the steps of FIGS. 3 to 5 result in the generation of the spoken dialogue system configuration data. These steps must be performed before a user can enter into a dialogue in order to access the information contained in the text document.

Figure 6:
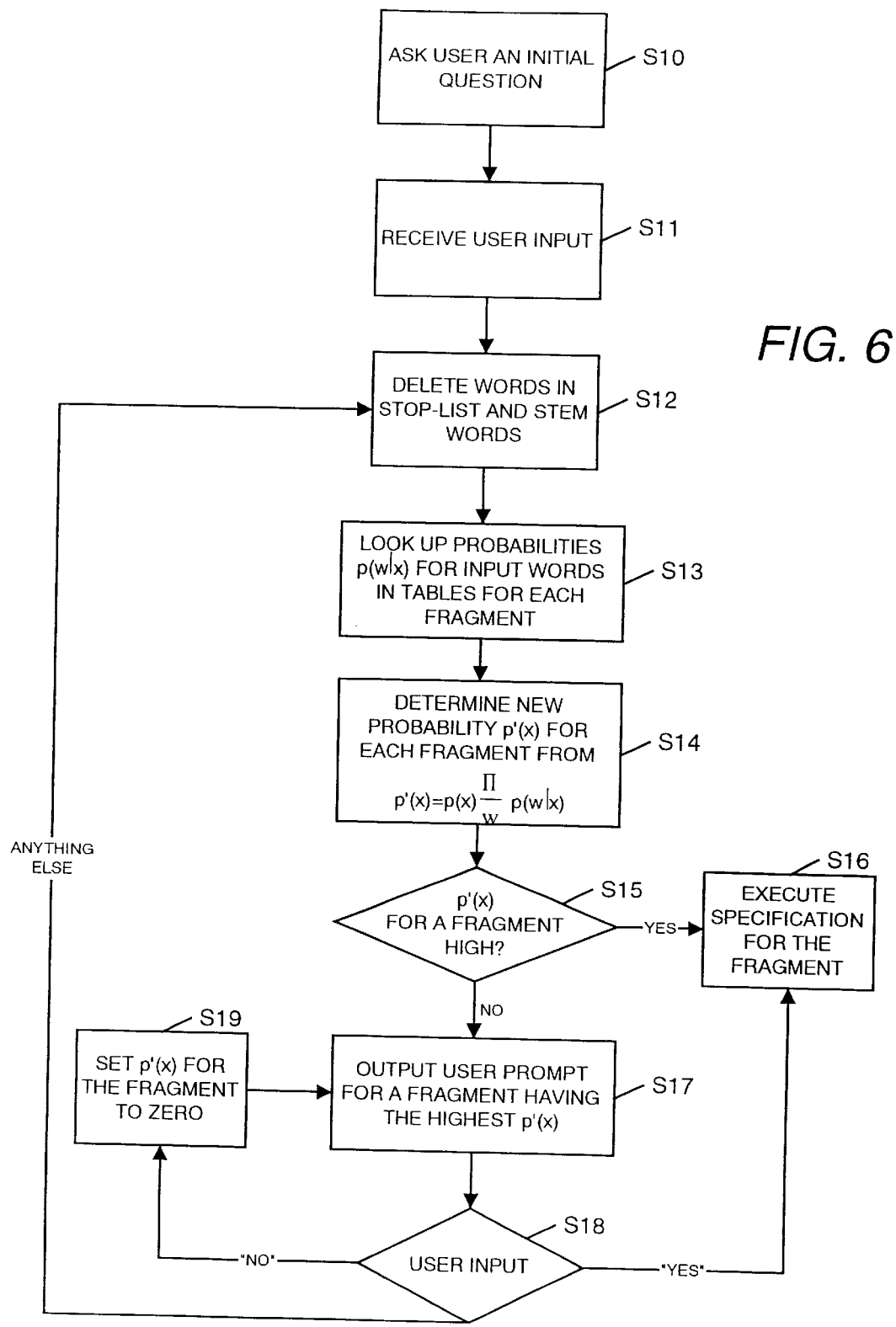
FIG. 6 is a flow diagram of the implementation of the spoken dialogue system of the embodiment of the present invention.

The implementation of the spoken dialogue system as an interface between a machine and a user will now be described with reference to the flow diagram of FIG. 6.

In step S10 the machine asks the user an initial question e.g. "What would you like to know?". In step S11 the machine receives the user input e.g. "I would like to know how to print things stored in my mail box". In step S12 non-information bearing words identified from the stop list are deleted and words are stemmed. For example, in the above example input, the words "I", "would", "like", "to", "know", "how", "to", "in", "things" and "the" are ignored. Thus the words "print", "store", "mail" and "box" are identified as important words. These words are then used in step S13 to look-up the probabilities p(w|x) for each fragment. In step S14 a new probability p'(x) is then determined for each fragment using the equation:

$$p'(x) = p(x) \prod_w (w \mid x)$$

In step S15 it is then determined whether there is a probability p'(x) which is high for a fragment. In the example given hereinabove, there is likely to be a high probability of the user's input matching the example fragment because of the match of the words "print", "mail" and "box". Thus in step S16 the spoken dialogue system specification for the fragment is identified from the list and executed.

If in step S15 however there is no probability p'(x) for a fragment which is significantly high, in step S17 the user prompt for the fragment having the highest probability p'(x) is output. In step S18 the user input is received and if the user input is positive e.g. the prompt stated "Do you wish to know how to print documents stored in the mail box" and the user response is "yes" in step S16 the spoken dialogue system specification is executed for the fragment. If however, the user input is "no" i.e. a negative response, in step S19 the probability p'(x) for the fragment is set to zero and the process returns to step S17 to output a user prompt for a fragment having the next highest probability. If in step S18 any other user input is received, the process returns to step S12 to use this user input to try to identify a more relevant spoken dialogue system specification for a fragment.

In this embodiment, if a user says "no" to a number of prompts, the system can decide to return to step S10 to ask the user a further questions in order to try to arrive at the selection of a spoken dialogue specification for execution.

It can be seen from the foregoing embodiment that the present invention provides a dialogue system for interactively presenting the information content of a text document to a user by providing a search facility which is not a part of the original document. The information content of the document is segmented into identifiable segments and probabilities for search words are associated with each segment. If this association between the probabilities of input words from a user and corresponding segments which provide the ability to identify an appropriate segment and hence an appropriate dialogue instruction set for execution by the spoken dialogue system.

Although the embodiment of the present invention described hereinabove comprises a spoken dialogue system, the present invention is not limited to such. The present invention encompasses any form of dialogue system which can provide an interface between a user a machine to allow a dialogue therebetween.

Other modifications which lie within the spirit and scope of the present invention will be apparent to a skilled person in the art.

What is claimed is:

1. A machine having a user interface comprising:
   inputting means for inputting words from a user;
   outputting means for outputting words to a user;
   text inputting means for inputting a text document;
   fragmentation means for identifying a plurality of passages in said text document;
   instruction set generation means for generating, for each one of said plurality of passages, a corresponding dialogue instruction set to provide a plurality of said dialogue instruction sets with each dialogue instruction set corresponding to a respective different one of said plurality of passages;
   score determining means for determining scores for words appearing in each of said plurality of passages;
   instruction set storage means for storing said plurality of dialogue instruction sets;
   score storage means for storing said scores;
   search means for receiving the input words, for determining scores for at least some of the input words from said score storage means, and for identifying the one of said plurality of passages in said text having a highest combined score for the input words; and
   dialogue execution means for executing a dialogue instruction set corresponding to said passage identified as having the highest combined score to generate words for output by said outputting means to the user in response to words input by said inputting means.

2. A machine according to claim 1, further comprising user prompt means for generating a user prompt corresponding to said passage having the highest combined score for output by said outputting means if said search means does not determine a said passage with a combined score significantly higher than the combined scores for other said passages, said dialogue execution means being responsive to one or more positive input words to execute said dialogue instruction set, and said search means being responsive to one or more negative input words to reduce the score for said passage and to redetermine a said passage having a highest combined score.

3. A machine according to claim 1 for providing a spoken dialogue interface, wherein said inputting means is adapted to input spoken words, said outputting means is adapted to output spoken words, said instruction set storage means is adapted to store spoken dialogue instruction sets, and said dialogue execution means is adapted to execute a spoken dialogue instruction set.

4. A machine according to claim 1, wherein said search means is adapted to ignore non information bearing words when determining the scores.

5. Configuration apparatus for generating dialogue configuration data, the apparatus comprising:
   text inputting means for inputting a text document;
   fragmentation means for identifying a plurality of passages in said text document;
   instruction set generation means for generating, for each one of said plurality of passages, a corresponding dialogue instruction set to provide a plurality of said dialogue instruction sets with each dialogue instruction set corresponding to a respective different one of said plurality of passages and for storing said dialogue instruction sets in instruction set storage means; and
   score determining means for determining scores for words appearing in each of said plurality of passages and for storing said scores in score storage means.

6. An interface method for a machine, the method comprising:
   receiving a text document;
   identifying a plurality of passages in said text document;
   generating, for each one of said plurality of passages, a corresponding dialogue instruction set to provide a plurality of said dialogue instruction sets with each dialogue instruction set corresponding to a respective different one of said plurality of passages;
   storing said dialogue instruction sets;
   determining scores for words appearing in each of said plurality of passages;
   storing said scores;
   receiving words from a user;
   determining scores for at least some of the words received from the user using said stored scores;
   identifying the one of said plurality of passages in said text document having a highest combined score for the words received from the user; and
   identifying and executing the one of said plurality of dialogue instruction sets corresponding to said identified passage to generate words for output to the user in response to the received words.

7. Processor implementable instruction code for controlling a processor to implement the method of claim 6.

8. A storage medium storing the processor implementable instruction code according to claim 7.

9. An interface method according to claim 6, further comprising:
   a) generating a user prompt corresponding to said identified passage if said identified passage does not have a combined score significantly higher than the combined scores for other said passages,
   b) if a positive response is received from the user, executing said dialogue instruction set or if a negative response is received from the user, reducing the score for said identified passage and re-identifying a said passage having a highest combined score, and
   c) repeating steps a) and b) if a said dialogue instruction set is not executed.

10. An interface method according to claim 9, wherein if anything other than a positive or negative response is received from the user, the steps of claim 6 are repeated using the words of the response as the received words from the user.

11. An interface method according to claim 6, for providing a spoken dialogue interface for the machine, wherein the words received from the user are spoken words, said dialogue instruction set comprises a spoken dialogue instruction set which is executed to generate spoken words for output and to respond to received spoken words.

12. An interface method according to claim 6, wherein the step of determining scores comprises determining scores for only information bearing received words.

13. A method of generating dialogue configuration data, the method comprising the steps of:
   receiving a text document;
   identifying a plurality of passages in said text document;
   generating, for each one of said plurality of passages, a corresponding dialogue instruction set to provide a plurality of said dialogue instruction sets with each dialogue instruction set corresponding to a respective different one of said plurality of passages;

storing said plurality of dialogue instruction sets;

determining scores for words appearing in each of said plurality of passages; and storing said scores.

14. A storage medium storing said dialogue instruction sets and said scores for words generated in accordance with claim 13.

15. Configuration apparatus for generating dialogue configuration data, the apparatus comprising:

a text receiver operable to receive a text document;

a fragmenter operable to identify a plurality of passages in said text document;

an instruction set generator operable to generate, for each one of said plurality of passages, a corresponding dialogue instruction set to provide a plurality of said dialogue instruction sets with each dialogue instruction set corresponding to a respective different one of said plurality of passages and to store said dialogue instruction sets in an instruction set store; and a score determiner operable to determine scores for words appearing in each passage and to store said scores in a score store.

16. Apparatus for conducting a dialogue with a user, the apparatus comprising:

configuration apparatus in accordance with claim 15;

a user input receiver operable to receive words from a user;

an output provider operable to output words to a user;

a passage identifier operable to determine from said score store scores for at least some of the words received by the user input receiver and to identify the one of said plurality of passages having a highest combined score for the received words; and a dialogue executor operable to execute the dialogue instructions set corresponding to said identified passage to generate words for output to the user by said output provider means in response to the received words.

17. Configuration apparatus for generating dialogue configuration data from text data containing mark-up language tags, the apparatus comprising:

a text receiver operable to receive text data containing mark-up language tags;

a fragmenter operable to define text fragments in the text data on the basis of the mark-up language tags in the text data to provide a plurality of text fragments;

a dialogue instruction set generator operable to generate, for each one of said plurality of text fragments, a corresponding dialogue instruction set to provide a plurality of said dialogue instruction sets with each dialogue instruction set corresponding to a respective different one of said plurality of text fragments; and a score determiner operable to determine scores for words appearing in each of said plurality of text fragments.

18. Apparatus for conducting a dialogue with a user, the apparatus comprising:

configuration apparatus in accordance with claim 17;

a user input receiver operable to receive words from a user;

an output provider operable to output words to a user;

a passage identifier operable to determine from said score store scores for at least some of the words received by the user input receiver and to identify the one of said plurality of passages having a highest combined score for the received words; and a dialogue executor operable to execute the dialogue instruction set corresponding to said identified passage to generate words for output to the user by said output provider means in response to the received words.

19. A method of generating dialogue configuration data from text data containing mark-up language tags, the method comprising the steps of:

receiving text data containing mark-up language tags;

defining text fragments in the text data on the basis of the mark-up language tags in the text data to provide a plurality of text fragments;

generating, for each one of said plurality of text fragments, a corresponding dialogue instruction set to provide a plurality of said dialogue instruction sets with each dialogue instruction set corresponding to a respective different one of said plurality of text fragments; and determining scores for words appearing in each of said plurality of text fragments.

20. A storage medium storing program instructions for programming a processor to carry out a method in accordance with claim 19.

* * * * *

UNITED STATES PATENT AND TRADEMARK OFFICE
CERTIFICATE OF CORRECTION

PATENT NO.    : 6,832,197 B2
DATED         : December 14, 2004
INVENTOR(S)   : Wide Roeland Hogehout It is certified that error appears in the above-identified patent and that said Letters Patent is hereby corrected as shown below:

Column 2,
Line 55, "repeated-until" should read -- repeated until --.

Column 5,
Line 46, "<list, item>" should read -- <list. item> --; and
Line 58, "&(U00A0;>" should read -- &U00A0;> --.

Column 8,
Line 20, "$p'(x)=p(x)\prod_w (w|x)$" should read --$p'(x)=p(x)\prod_w p(w|x)$--.

Signed and Sealed this

Twenty-first Day of June, 2005

JON W. DUDAS
*Director of the United States Patent and Trademark Office*